United States Patent
Mostafa et al.

(10) Patent No.: US 9,254,798 B1
(45) Date of Patent: Feb. 9, 2016

(54) VEHICLE TELEMATICS UNIT POWER MANAGEMENT

(71) Applicant: General Motors LLC, Detroit, MI (US)

(72) Inventors: Ashraf Mostafa, Auburn Hills, MI (US); Abuzafor M. Rasal, Hamtramck, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/495,316

(22) Filed: Sep. 24, 2014

(51) Int. Cl.
*B60R 16/03* (2006.01)
*H04M 3/42* (2006.01)

(52) U.S. Cl.
CPC . *B60R 16/03* (2013.01); *H04M 3/42* (2013.01)

(58) Field of Classification Search
CPC ............ H04W 52/02; H04W 52/0229; H04W 52/0241; H04W 52/287; H04W 52/28; H04W 52/288; H04L 12/40039; H04L 67/12; H04L 2012/40273; B60R 16/03; H04M 3/42
See application file for complete search history.

(56) References Cited

U.S. PATENT DOCUMENTS

| | | | | |
|---|---|---|---|---|
| 4,698,748 A | * | 10/1987 | Juzswik et al. | 713/322 |
| 7,426,270 B2 | * | 9/2008 | Alves et al. | 379/406.08 |
| 8,879,451 B2 | * | 11/2014 | Yi et al. | 370/311 |
| 2003/0232619 A1 | * | 12/2003 | Fraser | 455/420 |
| 2004/0203340 A1 | * | 10/2004 | Oesterling | 455/9 |
| 2006/0287801 A1 | * | 12/2006 | Im | 701/99 |
| 2007/0001828 A1 | * | 1/2007 | Martinez | 340/426.25 |
| 2009/0088910 A1 | * | 4/2009 | Yi et al. | 701/1 |
| 2010/0311471 A1 | * | 12/2010 | Herve et al. | 455/569.2 |
| 2011/0033059 A1 | * | 2/2011 | Bhaskar et al. | 381/71.4 |
| 2012/0073892 A1 | * | 3/2012 | Hunter | 180/273 |
| 2012/0290859 A1 | * | 11/2012 | Saladin et al. | 713/310 |
| 2014/0074353 A1 | * | 3/2014 | Lee et al. | 701/36 |

\* cited by examiner

*Primary Examiner* — Rodney Butler
(74) *Attorney, Agent, or Firm* — Anthony Luke Simon; Reising Ethington P.C.

(57) ABSTRACT

A system and method(s) for conserving vehicle power when a primary power system of a vehicle is powered down during a voice call. The method includes the steps of: (a) receiving an indication that the vehicle's primary power system is powered down during the voice call; (b) after a predetermined period of time, determining whether to power down a secondary power system associated with a vehicle telematics system; (c) when it is determined that the secondary power system should be powered down, powering down the secondary power system; and (d) when it is determined that the secondary power should not be powered down, waiting the predetermined period of time before again determining whether to power down the secondary power system. The determination of steps (b) and (d) include detecting an absence of voice activity during the predetermined period of time of steps (b) or (d).

11 Claims, 3 Drawing Sheets

VEHICLE TELEMATICS UNIT POWER MANAGEMENT

TECHNICAL FIELD

The present invention relates to power management of a vehicle telematics unit.

BACKGROUND

Various vehicle systems may consume vehicle power when a vehicle is powered off (e.g., during ignition OFF). Some of these devices are at least partially controlled by a vehicle user such as the entertainment system and interior and exterior vehicle lighting. Other devices may consume power in a manner which is more transparent to the user's awareness such as a vehicle's global positioning satellite (GPS) device or a vehicle telematics device. Typically, such devices draw current from power stored in a vehicle battery when the vehicle is powered down.

It is known to power down some of these devices during at least part of the ignition OFF duration. For example, in vehicles having a telematics unit for placing and receiving voice and data calls, it is known to enter into a standby mode after the vehicle is switched off, wherein the telematics unit is powered down and then periodically powered back up briefly to see if there are any call attempts being made to the telematics unit. This process may be referred to as discontinuous reception (DRx). While useful for lessening power draw on the vehicle batteries, such approaches are not typically initiated until hours or days after the vehicle is powered down. This helps insure that any operator-controlled use of the telematics unit or other system has ceased.

SUMMARY

According to an embodiment of the invention, there is provided a method of conserving vehicle power when a primary power system of a vehicle is powered down during a voice call. The method includes the steps of: (a) receiving an indication that the vehicle's primary power system is powered down during the voice call; (b) after a predetermined period of time, determining whether to power down a secondary power system associated with a vehicle telematics system; (c) when it is determined that the secondary power system should be powered down, powering down the secondary power system; and (d) when it is determined that the secondary power should not be powered down, waiting the predetermined period of time before again determining whether to power down the secondary power system, wherein the determination of steps (b) and (d) include detecting an absence of voice activity during the predetermined period of time of steps (b) or (d).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below generally pertain to conserving vehicle power when the vehicle engine is off. More specifically, the method describes conserving vehicle power when telematics system equipment remains 'on' during or immediately following a voice call of an occupant of the vehicle—i.e., while the engine has been turned 'off.' This scenario may occur when the vehicle occupant is engaged in the voice call while the engine is running, and this connected call continues even after the vehicle engine was turned off. For example, once the call ends, the occupant may not physically disconnect or terminate the call, and in some instances, the vehicle telematics system may not automatically do so either. Or for example, once the call connection ends, the telematics unit continues to operate in a listening mode or other low power mode. In either of these scenarios, the telematics system equipment undesirably may continue to draw power—draining the vehicle's battery while the engine remains 'off.' The method(s) described herein include, when the engine is off, performing periodic checks to determine if whether the telematics unit is consuming battery power while in fact the voice call has ended. Once determined, the described method(s) power down the telematics system to conserve power and maintain the vehicle's allotted power budget.

This system and method(s) are described below with reference to FIGS. 2A-2B as they would be used in connection with the mobile vehicle communications system shown in FIG. 1.

Communications System—

Figure 1:
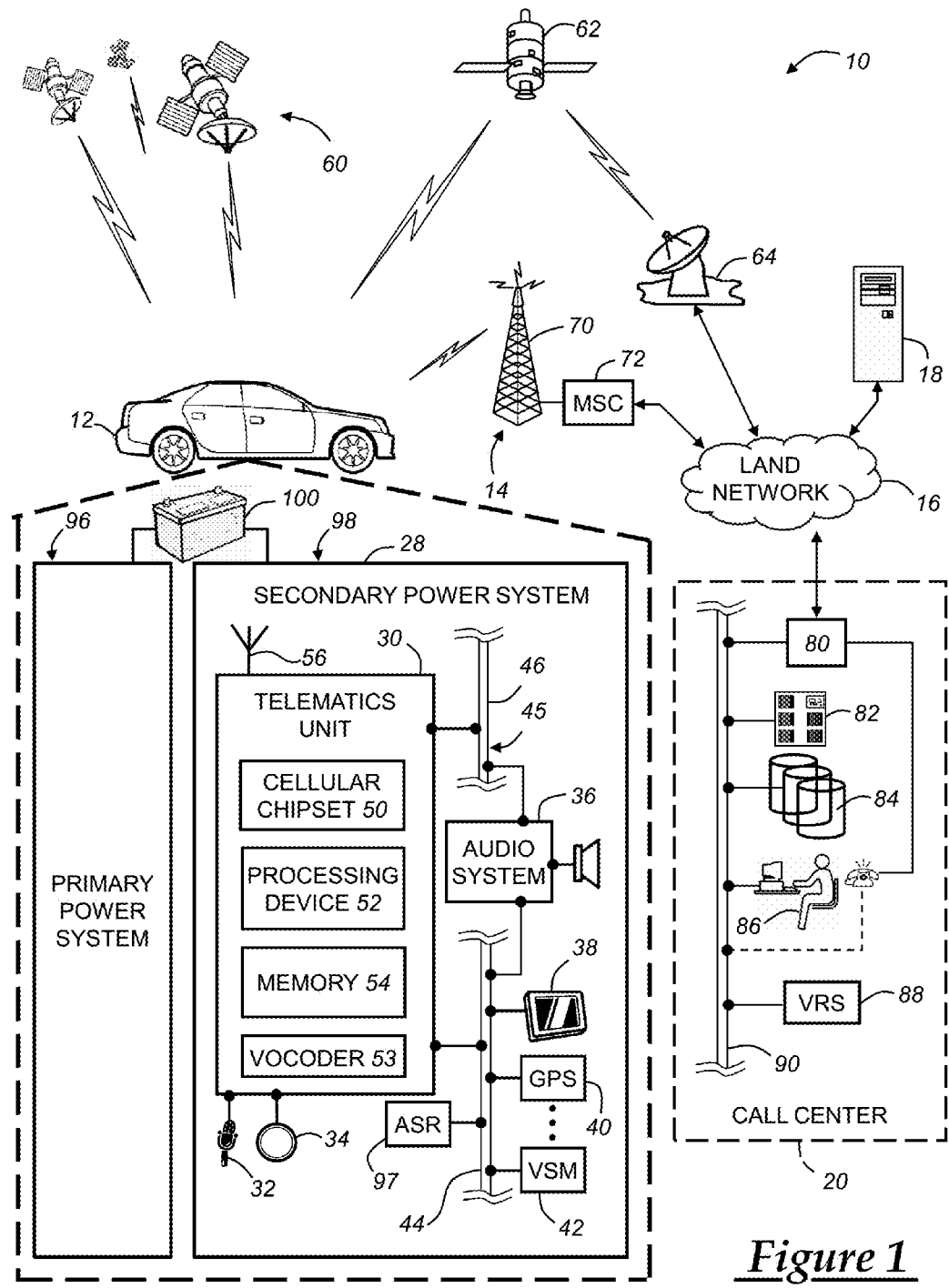
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 12, and more particularly its vehicle electronics 28, may be used by vehicle users such as a driver, a passenger, or any other suitable occupant. In addition, the vehicle user does not need to have ownership of the vehicle 12 (e.g., the user may be an owner or a licensee).

FIG. 1 illustrates a primary power system 96 and a secondary power system 98 both connected to and coupled to a vehicle battery 100. As used herein, the primary power system generally pertains to vehicle engine operations; the primary system is considered powered ON when the engine is running. The vehicle 12 may have multiple secondary power systems. The secondary power system 98 illustrates one example and generally comprises vehicle electronics 28. In at least one embodiment, the secondary power system is associated with the vehicle telematics system described below.

Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a vehicle bus 45 which may include a communications bus 44, an entertainment bus 46, or both. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 may utilize cellular communication according to a GSM standard, a CDMA standard, an LTE standard, etc. and thus may include a standard cellular chipset 50. Other embodiments of the telematics unit 30 may utilize a cellular chipset within a paired mobile device (e.g., a Bluetooth-paired Smartphone). Regardless, the telematics unit may include voice communications like hands-free calling, a wireless modem for data transmission, an electronic processing device 52, one or more digital memory devices 54, a vocoder 53, and a dual antenna 56. The telematics unit 30 further may be adapted to perform automatic speech recognition services (e.g., for hands-free calling as well as other services). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 also may comprise an automatic speech recognition (ASR) engine 97 that comprises hardware and/or an algorithm or software. The ASR engine 97 may be capable of voice activity detection, doubletalk detection, and/or any other suitable speech recognition technique. Skilled artisans will appreciate other techniques that may be suitably used. The ASR engine 97 is shown coupled to bus 44; however, this is merely an example. In other embodiments, it is coupled to bus 46 or even part of the telematics unit 30 itself.

The vehicle illustrated in FIG. 1 may be configured to be compliant with a vehicle power budget in order to ensure that, while the vehicle 12 draws power when the engine is 'off,' sufficient battery power exists to power the vehicle on again (e.g., at ignition). Power budgets may include a power parameter (e.g., in milli-Amp-hours or mAh) and a time parameter (e.g., in hours); these parameters assume a maximum duration of time at a constant power draw. While power budgets can vary, one embodiment of a predetermined telematics system power budget is provided as an example. In the example, the power budget is 1440 mAh (the power parameter) and 240 hours (the time parameter). Thus, when the vehicle engine is 'off,' the telematics unit and/or associated equipment must expend less than or equal to 1440 mAh over a time period of 240 hours in order to have sufficient power to turn 'on' again.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2A:
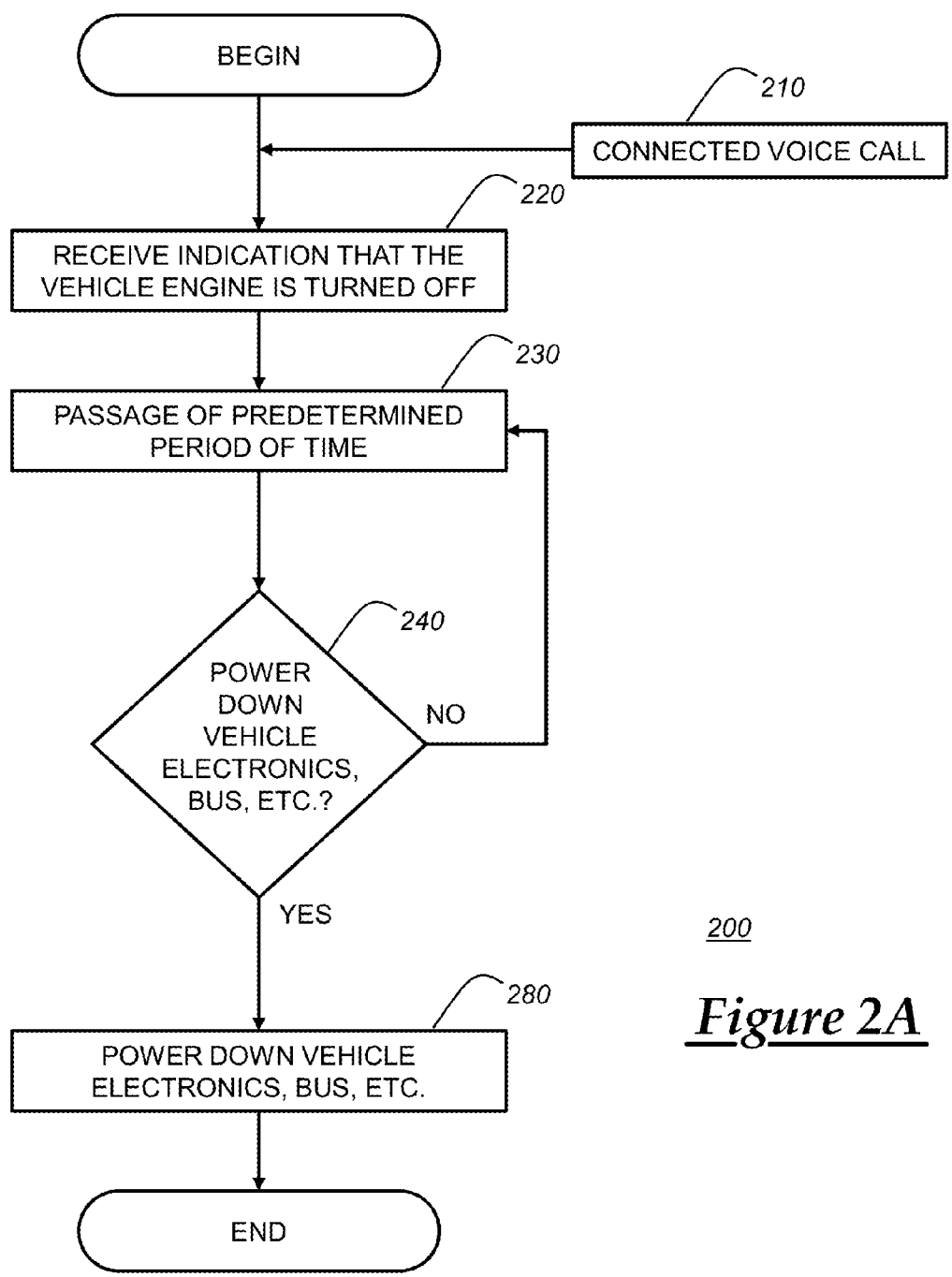
FIGS. 2A-2B are flow diagrams illustrating a method of conserving vehicle power according to at least one embodiment.

Turning now to FIG. 2A, there is shown a method 200 of conserving vehicle power when the primary power system 96 of the vehicle 12 is powered down during a voice call (or during a call over a voice channel). The method begins with step 210.

In step 210, the vehicle engine is running; i.e., the primary and secondary power systems 96, 98 are activated or operational. In step 210, a voice call is connected—the voice call may utilize the telematics unit 30 and may be mobile originated or mobile terminated. Following step 210, the method proceeds to step 220.

At step 220 an indication is received (e.g., by the telematics unit 30) that the vehicle engine has been turned 'off' or powered down. Thus in step 220, this includes the primary power system being powered down as well. Secondary power via system 98 may still be provided to the telematics unit 30 and associated equipment according to a low power mode—thereby maintaining the voice call connection. Next, the method proceeds to step 230.

In step 230, a predetermined period (T) of time passes. The predetermined period of time provides an opportunity for the voice call to be terminated by the user, by the other party, or by the telematics unit itself. During the predetermined period of time, the voice call may continue. Or instead, in some circumstances, conversation between the vehicle user and the other party may end, the vehicle user may leave the vehicle, and the telematics unit 30 may remain engaged in the voice call. During this time, the telematics unit 30 may consume additional power and unnecessarily consume the vehicle's power budget.

The length or duration of the predetermined period of time may be based upon or associated with the vehicle power budget. According to one embodiment, the predetermined period of time may be set at a value representing use of approximately 1% of the vehicle power budget (or 1% of 1440 mAh). In one example, this power consumption may be associated with a predetermined period lasting approximately 25-30 minutes after the vehicle's engine is off. In another embodiment, the power consumption may equate to a predetermined period of time range (e.g., 8 minutes $\leq T \leq 10$ minutes).

After step 230, the method proceeds to step 240. In step 240, a determination is made as to whether to power down the secondary power system 98 based on whether the conversation between the vehicle user and the other party has ended. In one embodiment, this involves powering down all of the vehicle electronics 28 shown in FIG. 1. In other embodiments, only one or some of the devices in the vehicle electronics 28 are powered down—e.g., the telematics unit 30 and the vehicle bus 45 (e.g., the bus that communicates audio in a cabin of the vehicle). If in step 240 it is determined that the secondary power system (or a portion thereof) should not be powered down, the method returns to step 230 and repeats that step—e.g., the user was still engaged in a voice call during the predetermined period of time. If however in step 240 it is determined that the secondary power system (or a portion thereof) should be powered down, the method 200 proceeds to step 280. As will be described in greater detail below, in at least one embodiment, at least a part of the determination made in step 240 occurs during the predetermined period of time recited in step 230.

In step 280, the secondary power system 98 (or at least a preconfigured portion thereof) is powered down. Thereafter, the method 200 ends. Of course, the method may be repeated again once the vehicle is restarted, and another voice call remains connected when the vehicle 12 is again turned 'off.' In addition, once the secondary power system 98 is powered down, the vehicle 12 then may enter a DRx mode, if desired.

Figure 2B:
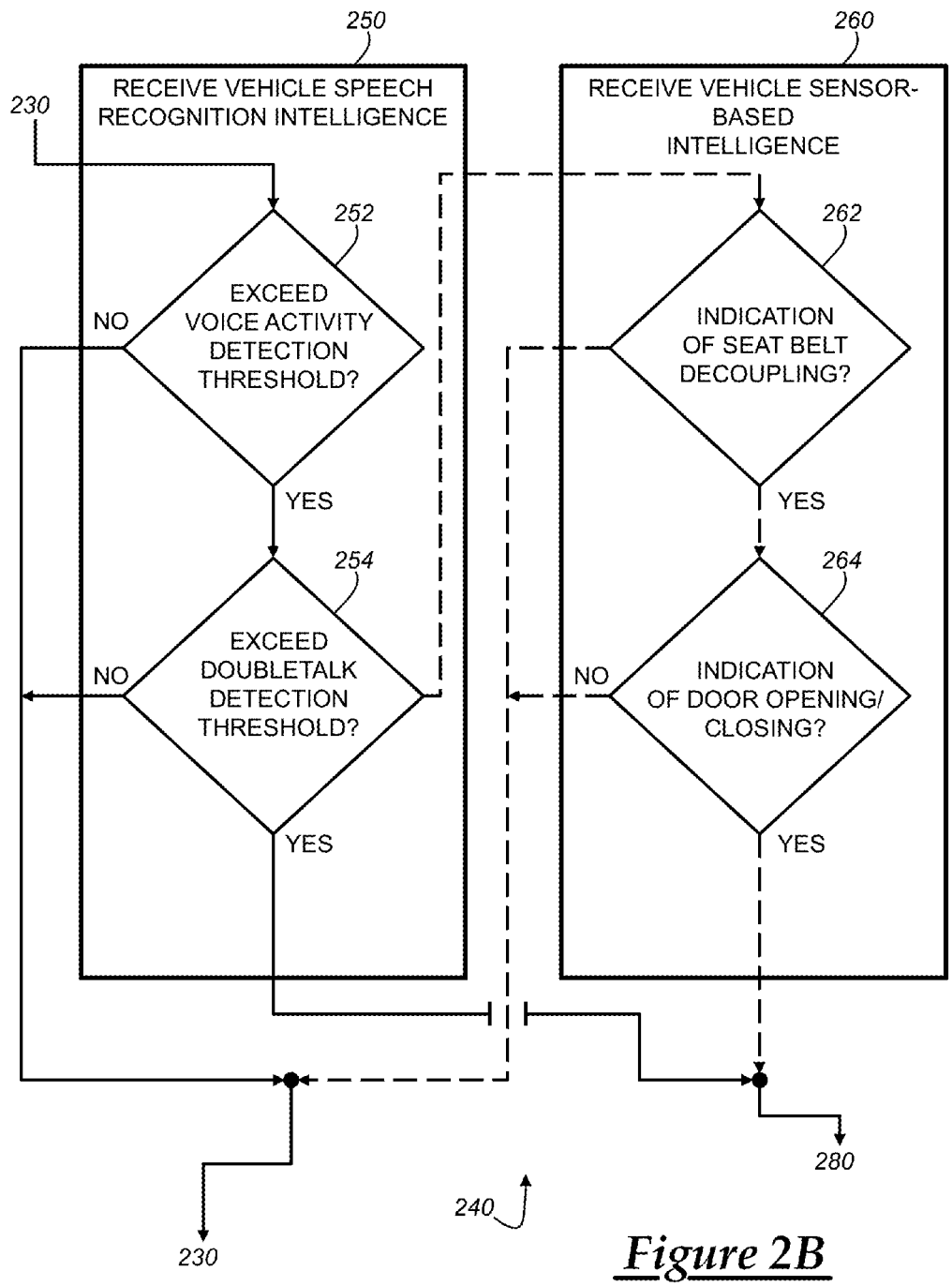

Now turning to FIG. 2B, in the illustration, one embodiment of step 240 is shown comprising a number of sub-steps (250, 252, 254, 260, 262, 264). For example, in sub-step 250, the telematics unit 30 receives from the ASR engine 97 data indicative of on-going speech during a voice call. For example, the ASR engine may send a signal to the telematics unit 30 via bus 45. The data may be in response to voice activity detection, doubletalk detection, and/or other suitable speech recognition techniques that indicate on-going speech during the connected voice call. Sub-step 250 includes sub-step 252.

Sub-step 252 determines whether a voice activity detection threshold has been exceeded. The threshold may be represented by a sound or audio value (e.g., in decibels) or may be represented by a power parameter or value (e.g., a value of a current parameter or a voltage parameter). Using either threshold, the presence or absence of human speech or utterances during the predetermined period of time may be determined.

According to one embodiment of sub-step 252, a noise floor value in the vehicle's cabin first is determined. The noise floor value may correspond with the ambient background noise within the cabin. Next, an audio threshold value is determined that is indicative of an absence of human speech within the cabin region. The audio threshold value may be a predetermined number of units greater than the noise or value, or the audio threshold value may be a predetermined ratio or percentage greater than the noise floor value. It will be appreciated that setting this threshold at least slightly higher than the noise floor value reduces false positives—i.e., an indication of speech when a value slightly higher than the noise floor value is received.

In any case, an audio value may be received via the vehicle microphone 32 during the predetermined period of time, and the telematics unit 30 may determine whether the received audio value exceeds the audio threshold value. When it does, the method 200 may proceed to step 254. When the received audio value does not exceed the audio threshold value, the method returns again to step 230 (allowing the passage again of the predetermined period of time, see FIG. 2A). According to some implementations of sub-step 252, the steps are performed using the vocoder 53 and/or speech recognition software residing on the telematics unit 30.

According to another embodiment of sub-step 252, a threshold power parameter that is associated with the operation of the telematics unit 30 during a listening mode is determined. The value of this parameter may be determined at the vehicle 12 or may be previously determined by the vehicle's manufacturer and stored in memory 54. The threshold power parameter may be indicative of an absence of human speech within the cabin region of the vehicle as well. Next, an actual power parameter of the telematics unit is determined; i.e., during the predetermined period of time. When the actual power parameter exceeds the threshold power parameter, the method 200 returns to step 230 (again, see FIG. 2A). And when the actual power parameter does not exceed the threshold power parameter (or is equal thereto), the method proceeds to step 254. In one embodiment, the threshold power parameter is approximately 30.0 milli-Amps (mA); thus, when the actual power parameter exceeds 30.0 mA, human speech may be detected. Table I illustrates sample electrical data taken both when human speech is absent and when human speech is present—and assumes a generally constant background or ambient noise during the sampling period.

TABLE I

|  | Absence of Human Speech | With Human Speech |
|---|---|---|
| Sample 1 | 29.67 | 30.36 |
| Sample 2 | 29.78 | 30.46 |
| Sample 3 | 29.89 | 30.96 |
| Sample 4 | 29.84 | 31.25 |
| Sample 5 | 29.90 | 31.36 |
| Sample 6 |  | 32.56 |

In each of the previous embodiments a series of audio frames may be analyzed. Furthermore, an average value of the series of audio frames may be determined in each instance. For example, in the first embodiment, the received audio value may be an average sound amplitude (decibels or dB) of the multiple audio frames. Or for example, in the second embodiment, the actual power parameter may be an average current amplitude (milli-amps or mA) or average voltage amplitude (milli-volts or mV) of the multiple audio frames. Other computations are also possible; the mean or medium value, etc.

As discussed above, in at least one implementation, the method 200 proceeds to sub-step 254. Here, the vocoder 53 and/or the telematics unit 30 determines a doubletalk detection threshold. Again, this may determined at the vehicle or determined by the vehicle's manufacturer.

As will be appreciated by skilled artisans, doubletalk detection includes identifying a desired signal (e.g., received by the microphone 32) and identifying an excitation signal (e.g., provided by a loudspeaker within the vehicle audio system 36). In speech signal processing, doubletalk is undesirable and eliminated using acoustic audio cancellers. However, in the present embodiment, the mere detection of doubletalk indicates a conversation still may be occurring between the vehicle user and another party (i.e., the voice call still continues). Likewise, the absence of doubletalk activity may be one indicator that the conversation between the vehicle user and the other party has ended. According to one embodiment, doubletalk detection may provide an indication that a passenger, for example in the rear of the vehicle, may be engaged in conversation with the other party, even though perhaps the driver or another passenger has exited the vehicle 12. This is particularly true in vehicle cabin environments where the microphone(s) 32 are at an opposing end of the cabin.

Regardless of where this is determined, if an absence of doubletalk activity is determined, the method 200 may proceed to step 280, or alternatively, the method may proceed to sub-step 260. For example, in at least one embodiment, only sub-steps 252, 254 are used to determine the presence of on-going speech during the voice call; thus, from sub-step 254, the method proceeds to step 280.

However, in at least one other implementation, the method 200 proceeds to sub-step 260 where the telematics unit 30 receives vehicle sensor-based data that indicates whether the vehicle user has left the vehicle. This sensor-based data may comprise seatbelt sensor data, vehicle door sensor data, and/or any other suitable vehicle sensor data. Sub-step 260 includes sub-step 262.

Sub-step 262 determines whether an indication has been received by the telematics unit 30 that a seatbelt or seatbelt clasp has been decoupled. If such an indication has been received, the telematics unit 30 may infer an indicator that the user has left the vehicle 12. And the method proceeds to sub-step 264. Otherwise, the method 200 proceeds again to step 230 (allowing the passage again of the predetermined period of time, see FIG. 2A).

Sub-step 264 determines whether an indication has been received by the telematics unit 30 that a door has been opened and/or closed. If such an indication has been received, the telematics unit 30 may infer another indicator that the user has left the vehicle 12. Together, an indication of a seatbelt decoupling and a vehicle door opening and/or closing is a reasonable inference that the vehicle user has left the vehicle—especially when the seatbelt corresponds with the particular door opened/closed. In this event, the method may proceed to step 280 (powering down the secondary power system, e.g., the telematics system in the vehicle 12). And otherwise where no door has been opened, as previously discussed, the method 200 proceeds to step 230 (allowing the passage again of the predetermined period of time, see FIG. 2A).

The sub-steps 252, 254, 262, and 264 may each be performed as described above; or in some instances, only some of them may be performed. For example, sub-step 252 could be performed without the remaining sub-steps—e.g., if the voice activity threshold was exceeded in sub-step 252, the method 200 would proceed directly to step 280 (instead of proceeding through sub-steps 254, 260, 262, 264, etc.). Or sub-step 252 and sub-step 264 could be performed—ultimately proceeding either to step 230 or step 280. These are merely examples; other possibilities or combinations are possible.

Thus there has been described a vehicle system for conserving battery power when a voice call is connected at the time a vehicle is powered down. The present system is capable of determining that a conversation between a vehicle user and another party has ended (the voice call ended) or that the voice call ended but the telematics system continues to operate consuming battery power. And thus, the system intelligently determines when to power down the vehicle's telematics system. The determination to power down may be based on voice activity detection, doubletalk detection, and interpretation of various vehicle sensors associated with the ingress or egress of the vehicle user.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of conserving vehicle power when a primary power system of a vehicle is powered down during a voice call, comprising the steps of:
   (a) receiving an indication that the vehicle's primary power system is powered down during the voice call;
   (b) after a predetermined period of time, determining whether to power down a secondary power system associated with a vehicle telematics system;
   (c) when it is determined that the secondary power system should be powered down, powering down the secondary power system; and
   (d) when it is determined that the secondary power should not be powered down, waiting the predetermined period of time before again determining whether to power down the secondary power system,
      wherein the determination of steps (b) and (d) include detecting an absence of voice activity associated with the voice call during the predetermined period of time of steps (b) or (d).

2. The method of claim 1, wherein determining steps (b) and (d) are performed using a vocoder.

3. The method of claim 1, wherein the determination of steps (b) or (d) comprise: receiving vehicle sensor data indicating a vehicle user has left the vehicle.

4. The method of claim 1, wherein powering down the secondary power system comprises powering down a telematics unit and a vehicle bus to which the telematics unit is coupled.

5. The method of claim 3, wherein the vehicle sensor data includes: seat belt sensor data, vehicle door sensor data, or both.

6. A method of conserving vehicle power when a primary power system of a vehicle is powered down during a voice call, comprising the steps of:
   (a) receiving an indication that the vehicle's primary power system is powered down during the voice call;
   (b) after a predetermined period of time, determining whether to power down a secondary power system associated with a vehicle telematics system;
   (c) when it is determined that the secondary power system should be powered down, powering down the secondary power system; and
   (d) when it is determined that the secondary power should not be powered down, waiting the predetermined period of time before again determining whether to power down the secondary power system,
      wherein the determination of steps (b) and (d) include detecting an absence of voice activity during the predetermined period of time of steps (b) or (d),
      wherein the determination of steps (b) and (d) comprise detecting an absence of doubletalk activity during the predetermined period of time of steps (b) and (d).

7. A method of conserving vehicle power when a primary power system of a vehicle is powered down during a voice call, comprising the steps of:
   (a) receiving an indication that the vehicle's primary power system is powered down during the voice call;
   (b) after a predetermined period of time, determining whether to power down a secondary power system associated with a vehicle telematics system;
   (c) when it is determined that the secondary power system should be powered down, powering down the secondary power system; and
   (d) when it is determined that the secondary power should not be powered down, waiting the predetermined period of time before again determining whether to power down the secondary power system,
      wherein the determination of steps (b) and (d) include detecting an absence of voice activity during the predetermined period of time of steps (b) or (d),
      wherein the determination of steps (b) and (d) comprise:
         determining an audio threshold value greater than a noise floor value of a cabin region of the vehicle, wherein the audio threshold value is indicative of an absence of human speech within the cabin region; and
         for the predetermined period of time in step (b) or (d), determining whether a received audio value for the predetermined period of time exceeds the audio threshold value, wherein, when the received audio value exceeds the audio threshold value, step (c) determines that the secondary power system should be powered down.

8. The method of claim 7, wherein the received audio value during the predetermined period of time in step (b) or (d) is determined by calculating an average value of a plurality of audio frames.

9. A method of conserving vehicle power when a primary power system of a vehicle is powered down during a voice call, comprising the steps of:
(a) receiving an indication that the vehicle's primary power system is powered down during the voice call;
(b) after a predetermined period of time, determining whether to power down a secondary power system associated with a vehicle telematics system;
(c) when it is determined that the secondary power system should be powered down, powering down the secondary power system; and
(d) when it is determined that the secondary power should not be powered down, waiting the predetermined period of time before again determining whether to power down the secondary power system,
wherein the determination of steps (b) and (d) include detecting an absence of voice activity during the predetermined period of time of steps (b) or (d),
wherein the determination of steps (b) and (d) comprise:
determining a threshold power parameter associated with a vehicle telematics unit during a DRx mode, wherein the threshold power parameter is indicative of silence within a cabin region of the vehicle;
for the predetermined period of time in step (b) or (d), determining whether an actual power parameter for the period of time is greater than the threshold power parameter, wherein, when the actual power parameter is greater than the threshold power parameter, step (c) determines that the secondary power system should be powered down.

10. The method of claim 9, wherein the actual power parameter during the predetermined period of time in step (b) or (d) is determined by calculating an average power parameter of a plurality of audio frames.

11. The method of claim 10, wherein the average power parameter IS a current parameter or voltage parameter.

* * * * *